(12) United States Patent
Barrick et al.

(10) Patent No.: US 11,410,301 B2
(45) Date of Patent: Aug. 9, 2022

(54) SYSTEM AND METHOD FOR DETERMINING RESIDUE COVERAGE WITHIN A FIELD BASED ON PRE-HARVEST IMAGE DATA

(71) Applicant: CNH Industrial America LLC, New Holland, PA (US)

(72) Inventors: Christopher Barrick, Morton, IL (US); Robert A. Zemenchik, Fair Oaks, CA (US); John H. Posselius, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 232 days.

(21) Appl. No.: 16/804,390

(22) Filed: Feb. 28, 2020

(65) Prior Publication Data

US 2021/0272255 A1    Sep. 2, 2021

(51) Int. Cl.
| | | |
|---|---|---|
| *G06T 7/00* | (2017.01) | |
| *A01B 79/00* | (2006.01) | |
| *G06V 20/10* | (2022.01) | |
| *B64C 39/02* | (2006.01) | |
| *G06V 20/68* | (2022.01) | |
| *A01C 21/00* | (2006.01) | |

(52) U.S. Cl.
CPC .......... *G06T 7/001* (2013.01); *A01B 79/005* (2013.01); *A01C 21/007* (2013.01); *G06V 20/188* (2022.01); *B64C 39/024* (2013.01); *G06T 2207/30188* (2013.01); *G06V 20/68* (2022.01)

(58) Field of Classification Search
CPC .......... G06K 9/00657; G06K 2209/17; A01C 21/007; G06T 7/001; G06T 2207/30188; G06T 7/0016; G06T 2207/10032; G05T 2207/30188; B64C 39/024; B64C 2201/123; G06V 20/188; G06V 20/17; G06V 20/68; A01B 79/005
See application file for complete search history.

(56) References Cited

U.S. PATENT DOCUMENTS

| | | |
|---|---|---|
| 9,282,688 B2 | 3/2016 | Casper et al. |
| 2008/0140431 A1 | 6/2008 | Anderson et al. |
| (Continued) | | |

OTHER PUBLICATIONS

Sullivan, Dana G., et al. "Evaluating techniques for determining tillage regime in the Southeastern Coastal Plain and Piedmont." (2006). (Year: 2006).*

*Primary Examiner* — Vu Le
*Assistant Examiner* — Tracy Mangialaschi
(74) *Attorney, Agent, or Firm* — Rebecca L. Henkel; Rickard K. DeMille

(57) ABSTRACT

A method for determining residue coverage within a field may include receiving, with one or more computing devices, first and second images of the field. The first image may depict a portion of the field at a first time during a crop-growing period and the second image may depict the portion of the field at a second time during the crop-growing period, with the first and second times being different. Furthermore, the method may include generating, with the one or more computing devices, an estimated residue coverage map for the field based on the received first and second images. Additionally, the method may include generating, with the one or more computing devices, a prescription map for the field based on the estimated residue coverage map.

20 Claims, 5 Drawing Sheets

(56) References Cited

U.S. PATENT DOCUMENTS

| | | |
|---|---|---|
| 2017/0112043 A1 | 4/2017 | Nair et al. |
| 2018/0092295 A1* | 4/2018 | Sugumaran .......... A01C 23/007 |
| 2018/0210450 A1 | 7/2018 | Ferrari et al. |
| 2018/0310474 A1 | 11/2018 | Posselius et al. |
| 2018/0336410 A1 | 11/2018 | Posselius |
| 2018/0338422 A1* | 11/2018 | Brubaker ........... A01D 41/1275 |

\* cited by examiner

SYSTEM AND METHOD FOR DETERMINING RESIDUE COVERAGE WITHIN A FIELD BASED ON PRE-HARVEST IMAGE DATA

FIELD OF THE INVENTION

The present disclosure generally relates to determining residue coverage within a field and, more particularly, to systems and methods for determining residue coverage within a field using image data of the field captured during a crop-growing period.

BACKGROUND OF THE INVENTION

The amount of the residue discharged into a field during a harvesting operation impacts later agricultural operations performed on the field. More specifically, farmers may adjust their tillage, fertilizing, and/or drainage practices based on the amount of residue present within the field to maximize crop growth and productivity. For example, farmers may choose to perform additional tillage on portion of the field in which high levels of residue are present to create a level and uniform layer of tilled soil across the field to form a proper seedbed for subsequent planting operations. As such, systems have been developed to determine the amount of residue present within the field. Although such systems work well, further improvements are needed.

Accordingly, an improved system and method for determining residue coverage within a field would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a method for determining residue coverage within a field. The method may include receiving, with one or more computing devices, first and second images of the field. The first image may depict a portion of the field at a first time during a crop-growing period and the second image may depict the portion of the field at a second time during the crop-growing period, with the first and second times being different. Furthermore, the method may include generating, with the one or more computing devices, an estimated residue coverage map for the field based on the received first and second images. Additionally, the method may include generating, with the one or more computing devices, a prescription map for the field based on the estimated residue coverage map.

In another aspect, the present subject matter is directed to a system for determining residue coverage within a field. The system may include an imaging device configured to capture image data of the field during a crop-growing period. Moreover, the system may include a controller communicatively coupled to the imaging device. As such, the controller may be configured to receive first and second images from the imaging device. The first image may depict a portion of the field at a first time during the crop-growing period and the second image may depict the portion of the field at a second time during the crop-growing period, with the first and second times being different. Furthermore, the controller may generate an estimated residue coverage map for the field based on the received first and second images.

These and other features, aspects and advantages of the present technology will become better understood with reference to the following description and appended claims. The accompanying drawings, which are incorporated in and constitute a part of this specification, illustrate embodiments of the technology and, together with the description, explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
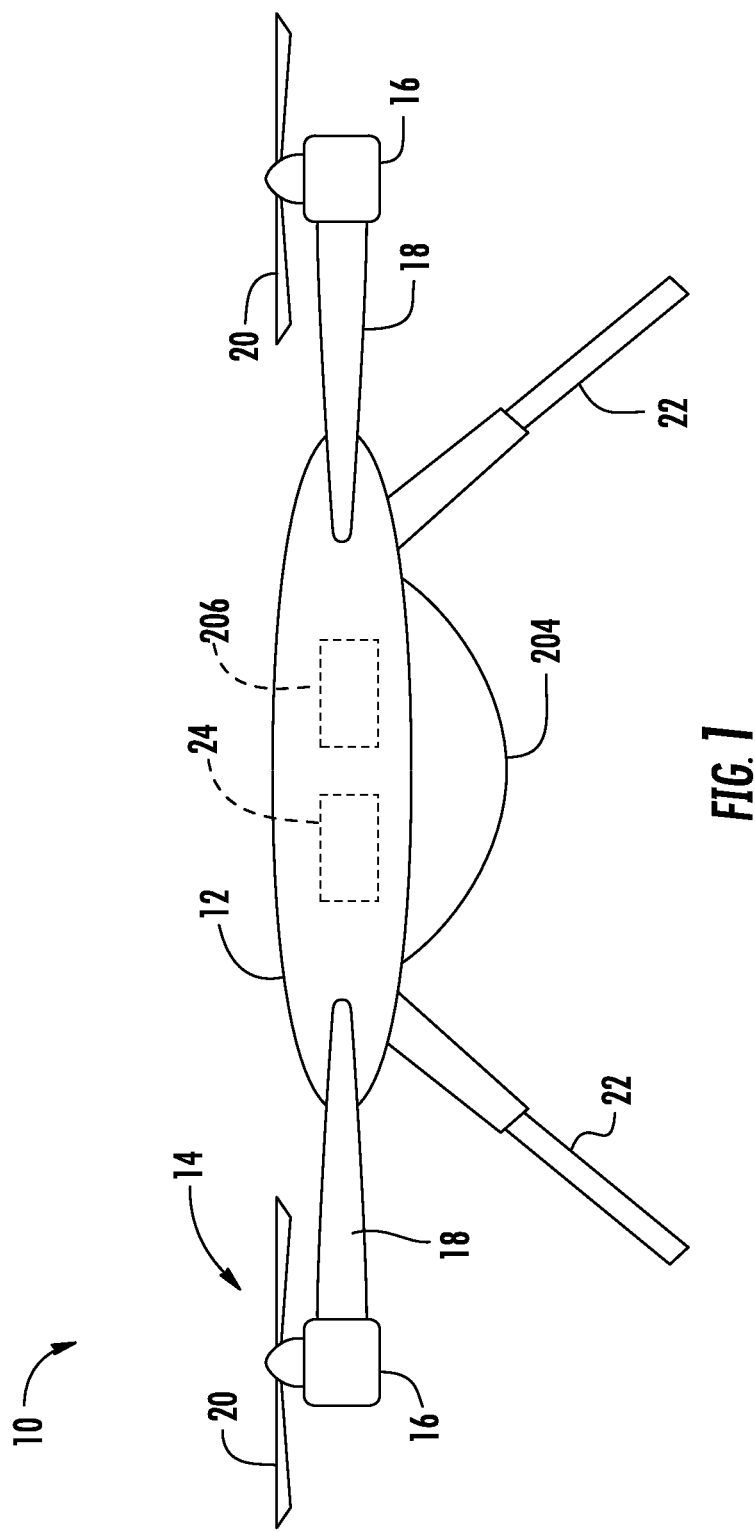
FIG. 1 illustrates a front view of one embodiment of an unmanned aerial vehicle (UAV) in accordance with aspects of the present subject matter, particularly illustrating an imaging device positioned on the UAV.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for determining residue coverage within a field. Specifically, in several embodiments, the disclosed system may include one or more imaging devices (e.g., a camera(s)) configured to capture image data of the field during a crop-growing period or season (e.g., the period of time between a planting operation and a subsequent harvesting operation). In this respect, the image data may be indicative of one or more parameters associated with the crops (e.g., a parameter(s) associated with the health/vitality of the crops, such as crop canopy growth) present within the field during the crop-growing period. For example, in one embodiment, the imaging device(s) may be positioned on an unmanned aerial vehicle (UAV). In such an embodiment, the UAV may be flown across the field several times during the crop-growing period, thereby allowing the imaging device(s) to capture image data of the crops at different times during the crop-growing season.

In accordance with aspects of the present subject, a controller of the disclosed system may be configured to estimate the residue coverage of the field based on image data captured by the imaging device(s). More specifically, after a harvesting operation is performed on the crops present within a field, residue may be present on the surface of the field. In general, the amount of residue present at (e.g., the residue coverage of) each position within the field may be based on various parameters (e.g., the size, health, vitality, and/or the like) of the crops present at that location. As such, the controller may be configured to receive a plurality of images of the field from the imaging device(s), with each image depicting at least a portion of the field at a different time during the crop-growing period. Thereafter, the controller may be configured to analyze the received images to estimate the amount of residue that will be present at various locations within the field upon completion of a harvesting operation. Moreover, the received images may be geo-referenced. As such, the controller may generate a residue coverage map of the field, with such map indicating the estimated post-harvest residue coverage at various locations within the field.

Additionally, in some embodiments, the controller may be configured to generate a prescription map for the field based on the estimated residue coverage map. More specifically, in such embodiments, the prescription map may then be used to control the operation of an agricultural implement during the performance a subsequent field operation. For example, in one embodiment, the controller may be configured to generate a tillage prescription map for controlling the tool depth, tool angle, and/or ground speed of a tillage implement during the performance of a subsequent tillage operation.

Thus, the disclosed systems and methods enable a more accurate estimation of the residue coverage of a field. For example, certain conditions (e.g., insect activity, dry conditions, etc.) present within the field early in the crop-growing period may have an impact on the amount of residue that will be present within the field after a harvesting operation. However, in certain instances, the existence of such conditions early in the crop-growing period may not be ascertainable from images of the field captured shortly before harvest. As such, by estimating residue coverage of a field based on a plurality of images of the field captured throughout the crop-growing period, the disclosed systems and methods may provide a more accurate estimation of the residue coverage of a field. Such improved residue coverage estimates may, in turn, improve control of agricultural implement during subsequent operations within the field and, as a result, leads to superior agricultural outcomes.

Referring now to the drawings, FIG. 1 illustrates a front view of one embodiment of an unmanned aerial vehicle (UAV) 10 in accordance with aspects of the present subject matter. In general, the UAV 10 may be configured to be flown over a field (e.g., an agricultural field) to allow aerial-based image data of the field and, more specifically, the crops growing therein to be captured by an associated imaging device(s) 204 supported on the UAV 10. As will be described below, the captured image data may be used to estimate the residue coverage of the field following a harvesting operation. In this respect, the UAV 10 may generally correspond to any suitable aerial vehicle capable of unmanned flight, such as any UAV capable of controlled vertical, or nearly vertical, takeoffs and landings. For example, in the illustrated embodiment, the UAV 10 is configured as a quadcopter. However, in alternative embodiments, the UAV 10 may be configured as any other multi-rotor aerial vehicle, such as a tricopter, hexacopter, or octocopter. In further embodiments, the UAV 10 may be configured as a single-rotor helicopter or a fixed wing, hybrid vertical takeoff and landing aircraft.

As shown, the UAV 10 may include various components that permit the UAV 10 to be flown across the field. Specifically, in several embodiments, the UAV 10 may include a body or frame 12 that supports a propulsion system 14. For example, in one embodiment, the propulsion system 14 may include four motors 16 (two are shown in FIG. 1), with each motor 16 coupled to the body 12 via a support arm 18. Each motor 16 may, in turn, be configured to rotationally drive an associated propeller 20. However, in alternative embodiments, the propulsion system 14 may have any other suitable configuration. For example, the propulsion system 14 may include fewer or more than four motors 16 and associated propellers 20. Additionally, in one embodiment, the UAV 10 may include a plurality of legs 22 configured to support the body 12 relative to a ground surface when the UAV 10 is in a landed position.

Moreover, the UAV 10 may also support one or more additional components, such as an on-board UAV controller 24. In general, the UAV controller 24 may be configured to control the operation of the UAV 10, such as by controlling the propulsion system 14 such that the UAV 10 is flown over the field. For instance, in one embodiment, the UAV controller 24 may be configured to receive flight plan data associated with a proposed flight plan for the UAV 10, such as a flight plan in which the UAV 10 makes a pass across the field in a manner that allows the imaging device(s) 204 to capture aerial-based image data across the field (or at least portion thereof) in which crops are growing. Based on such data, the UAV controller 24 may automatically control the operation of the UAV 10 such that the UAV 10 is flown across the field according to the proposed flight plan to allow the desired data to be collected by the imaging device(s) 204.

It should be further appreciated that the configuration of the UAV 10 described above and shown in FIG. 1 is provided only to place the present subject matter in an exemplary field of use. Thus, it should be appreciated that the present subject matter may be readily adaptable to any manner of UAV configuration.

In accordance with aspects of the present subject matter, the UAV 10 may include one or more imaging devices 204 coupled thereto and/or supported thereon for capturing images or other image data associated with the field over which the UAV 10 is flown. Specifically, in several embodiments, the imaging device(s) 204 may be provided in operative association with the UAV 10 such that the crops growing within the field are positioned within a field(s) of view or sensor detection range of the imaging device(s) 204 when the UAV 10 is flown across the field. In this respect, the imaging device(s) 204 may be used to capture image data depicting or otherwise associated with the crops present within the field when the UAV 10 makes a pass across the field. As will be described below, by analyzing the features of the crops depicted within the image data (e.g., the size, shape, and/or color of the crops), a controller 202 may then estimate the residue coverage of the field after such crops are harvested.

In general, the imaging device(s) 204 may correspond to any suitable sensing device(s) configured to detect or capture images or other aerial image data indicative of the crops present within the field. For instance, in several embodiments, the imaging device(s) 204 may correspond to a suitable camera(s) (e.g., an RGB or NDVI camera(s)) configured to capture three-dimensional images of the field and, more specifically, the crops growing therein, thereby allowing features of the crops to be analyzed. For instance, in a particular embodiment, the imaging device(s) 204 may correspond to a stereographic camera(s) having two or more lenses with a separate image sensor for each lens to allow the camera(s) to capture stereographic or three-dimensional images. In further embodiments, the imaging device(s) 204 may correspond to any other suitable sensing device(s) configured to detect or capture images or image-like data associated with the soil flow around the ground-engaging tools, such as a monocular camera(s), a radio detection and ranging (RADAR) sensor(s), or a light detection and ranging (LIDAR) sensor(s).

It should be appreciated that the imaging device(s) 204 may be mounted on or otherwise installed on the UAV 10 at any suitable location(s). For example, as shown in FIG. 1, in one embodiment, an imaging device 204 may be installed on the underside of the UAV body 12 such that the field of view of the imaging device 204 is directed at the crops present within the field when the UAV 10 makes a pass across the field. However, in other embodiments, the imaging device(s) 204 may be installed on at any other suitable location on the UAV 10 such that the imaging device(s) 204 is able to capture image data of the crops present within the field. Furthermore, in alternative embodiments, the imaging device(s) 204 may be mounted on another piece of equipment. For example, the imaging device(s) 204 may be mounted on an aircraft (e.g., a manned aircraft), a satellite, an irrigation device (e.g., a center irrigation pivot), and/or an agricultural implement configured to traverse the field during the crop-growing period (e.g., a sprayer, a side-dresser, and/or an inter-seeder). Moreover, although FIG. 1 illustrates one imaging device 204 installed on the UAV 10, any other suitable number of imaging devices 204 may be installed the UAV 10, such as two or more imaging devices 204.

Additionally, as shown in FIG. 1, the UAV 10 may also include one or more positioning device(s) 206. In one embodiment, the positioning device(s) 206 may be configured to determine the current location of the UAV 10 within the field using a satellite navigation position system (e.g. a GPS system, a Galileo positioning system, the Global Navigation satellite system (GLONASS), the BeiDou Satellite Navigation and Positioning system, and/or the like). In such an embodiment, the location determined by the positioning device(s) 206 may be transmitted to the UAV controller 24 (e.g., in the form coordinates) and stored within the controller's memory for subsequent processing and/or analysis. By continuously monitoring the location of the UAV 10 as a pass is being made across the field, each image captured by the imaging device 204 may be geo-located within the field. For instance, in one embodiment, the location coordinates derived from the positioning device(s) 206 and the image data captured by the imaging device(s) 204 may both be time-stamped. In such an embodiment, the time-stamped data may allow each image to be matched or correlated to a corresponding set of location coordinates received or derived from the positioning device(s) 206, thereby allowing an estimated residue coverage map of the field to be generated that identifies the estimated residue coverage at various locations within the field. As will be described below, the estimated residue coverage map may be used to control the operation of an agricultural implement (e.g., a tillage implement) and/or an associated work vehicle (e.g., an agricultural tractor) during one or more post-harvesting operations (e.g., a tillage operation) performed on the field.

Figure 2:
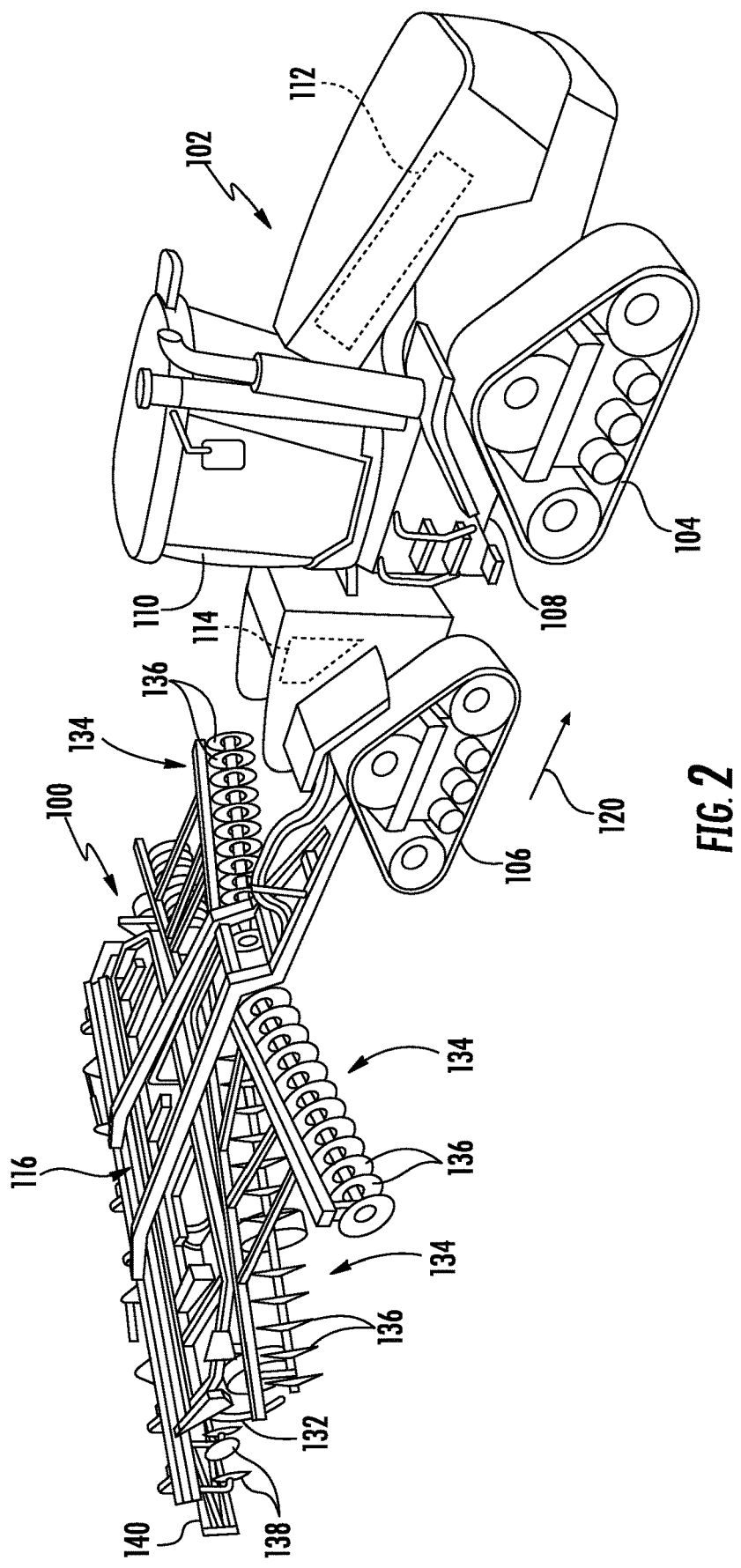
FIG. 2 illustrates a perspective view of one embodiment of a work vehicle towing an implement in accordance with aspects of the present subject matter.
Figure 3:
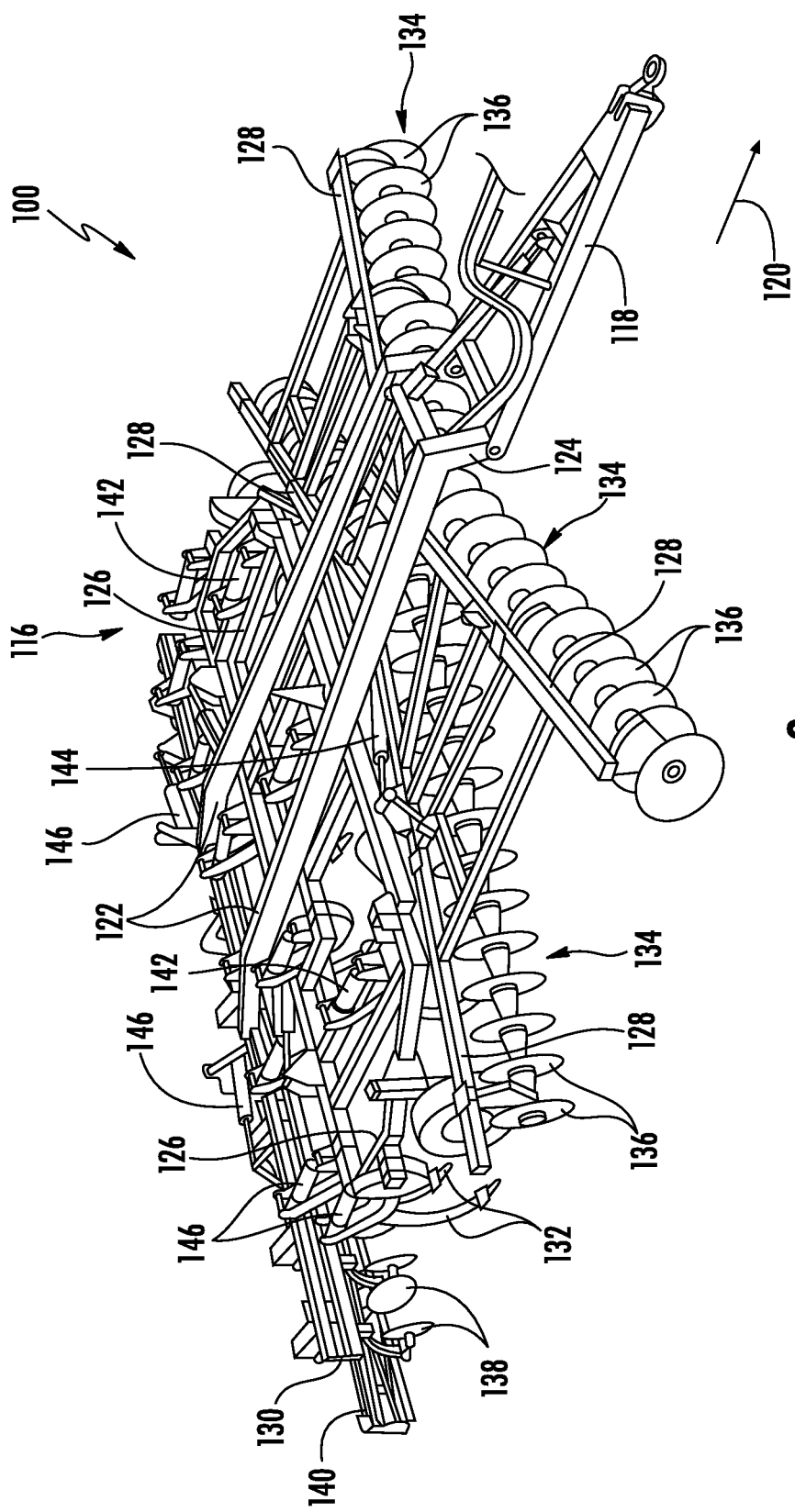
FIG. 3 illustrates a perspective view of the implement shown in FIG. 3.

FIGS. 2 and 3 illustrate perspective views of one embodiment of an agricultural implement 100 and an associated work vehicle 102 in accordance with aspects of the present subject matter. Specifically, FIG. 2 illustrates a perspective view of the implement 100 being towed by the work vehicle 102 (e.g., across a field). Additionally, FIG. 3 illustrates a perspective view of the implement 100 shown in FIG. 2. As shown in the illustrated embodiment, the implement 100 is configured as a tillage implement and the work vehicle 102 is configured as an agricultural tractor. However, in other embodiments, the implement 100 may be configured as any other suitable agricultural implement. Furthermore, in alternative embodiments, the work vehicle 102 may be configured as any other suitable agricultural vehicle.

As particularly shown in FIG. 2, the work vehicle 102 includes a pair of front track assemblies 104 (one is shown), a pair of rear track assemblies 106 (one is shown), and a frame or chassis 108 coupled to and supported by the track assemblies 104, 106. An operator's cab 110 may be supported by a portion of the chassis 108 and may house various input devices (e.g., a user interface) for permitting an operator to control the operation of one or more components of the work vehicle 102 and/or one or more components of the implement 100. Additionally, the work vehicle 102 may include an engine 112 and a transmission 114 mounted on the chassis 108. The transmission 114 may be operably coupled to the engine 112 and may provide variably adjusted gear ratios for transferring engine power to the track assemblies 104, 106 via a drive axle assembly (not shown) (or via axles if multiple drive axles are employed).

Moreover, as shown in FIGS. 2 and 3, the implement 100 may generally include a carriage frame assembly 116 configured to be towed by the work vehicle 102 via a pull hitch or tow bar 118 in a direction of travel the vehicle (indicated by arrow 120). In general, the carriage frame assembly 116 may be configured to support a plurality of ground-engaging tools, such as a plurality of shanks, disk blades, leveling blades, basket assemblies, and/or the like. In several embodiments, the various ground-engaging tools may be configured to engage the soil within the field across which the implement 100 is being towed, thereby performing a tillage operation on the field.

As particularly shown in FIG. 3, the carriage frame assembly 116 may include aft-extending carrier frame members 122 coupled to the tow bar 118. In addition, reinforcing gusset plates 124 may be used to strengthen the connection between the tow bar 118 and the carrier frame members 122. In several embodiments, the carriage frame assembly 116 may generally support a central frame 126, a forward frame 128 positioned forward of the central frame 126 in the direction of travel 120, and an aft frame 130 positioned aft of the central frame 126 in the direction of travel 120. As shown in FIG. 3, in one embodiment, the central frame 126 may correspond to a shank frame configured to support a plurality of ground-engaging shanks 132 configured to till the soil as the implement 100 is towed across the field. However, in other embodiments, the central frame 126 may be configured to support any other suitable ground-engaging tools.

Additionally, as shown in FIG. 3, in one embodiment, the forward frame 128 may correspond to a disk frame configured to support various gangs or sets 134 of disk blades 136. In such an embodiment, each disk blade 136 may, for example, include both a concave side (not shown) and a convex side (not shown). In addition, the various gangs 134 of disk blades 136 may be oriented at an angle relative to the direction of travel 120 to promote more effective tilling of the soil. However, in other embodiments, the forward frame 128 may be configured to support any other suitable ground-engaging tools.

Moreover, like the central and forward frames 126, 128, the aft frame 130 may also be configured to support a plurality of ground-engaging tools. For instance, in the illustrated embodiment, the aft frame 130 is configured to support a plurality of leveling blades 138 and rolling (or crumbler) basket assemblies 140 positioned aft of the shanks 132. However, in other embodiments, any other suitable ground-engaging tools may be coupled to and supported by the aft frame 130, such as a plurality closing disks.

In addition, the implement 100 may also include any number of suitable actuators (e.g., hydraulic cylinders) for adjusting the relative positioning of, penetration depth of, and/or force applied to the various ground-engaging tools 132, 136, 138, 140. For instance, the implement 100 may include one or more first actuators 142 coupled to the central frame 126 for raising or lowering the central frame 126 relative to the ground, thereby allowing adjustment of the penetration depth of and/or the forced applied to the shanks 132. Similarly, the implement 100 may include one or more second actuators 144 coupled to the forward frame 128 to adjust the penetration depth of, the angle/orientation of, and/or the force applied to the disk blades 136. Moreover, the implement 100 may include one or more third actuators 146 coupled to the aft frame 130 to allow the aft frame 130 to be moved relative to the central frame 126, thereby allowing the relevant operating parameters of the ground-engaging tools 138, 140 supported by the aft frame 130 (e.g., the force applied to and/or the penetration depth of) to be adjusted.

It should be appreciated that the configuration of the work vehicle 102 described above and shown in FIG. 2 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 102 or rely on tires/wheels in lieu of the track assemblies 104, 106.

It should also be appreciated that the configuration of the implement 100 described above and shown in FIGS. 2 and 3 is only provided for exemplary purposes. Thus, it should be appreciated that the present subject matter may be readily adaptable to any manner of implement configuration. For example, as indicated above, each frame section of the implement 100 may be configured to support any suitable type of ground-engaging tools, such as by installing closing disks on the aft frame 130 of the implement 100.

Figure 4:
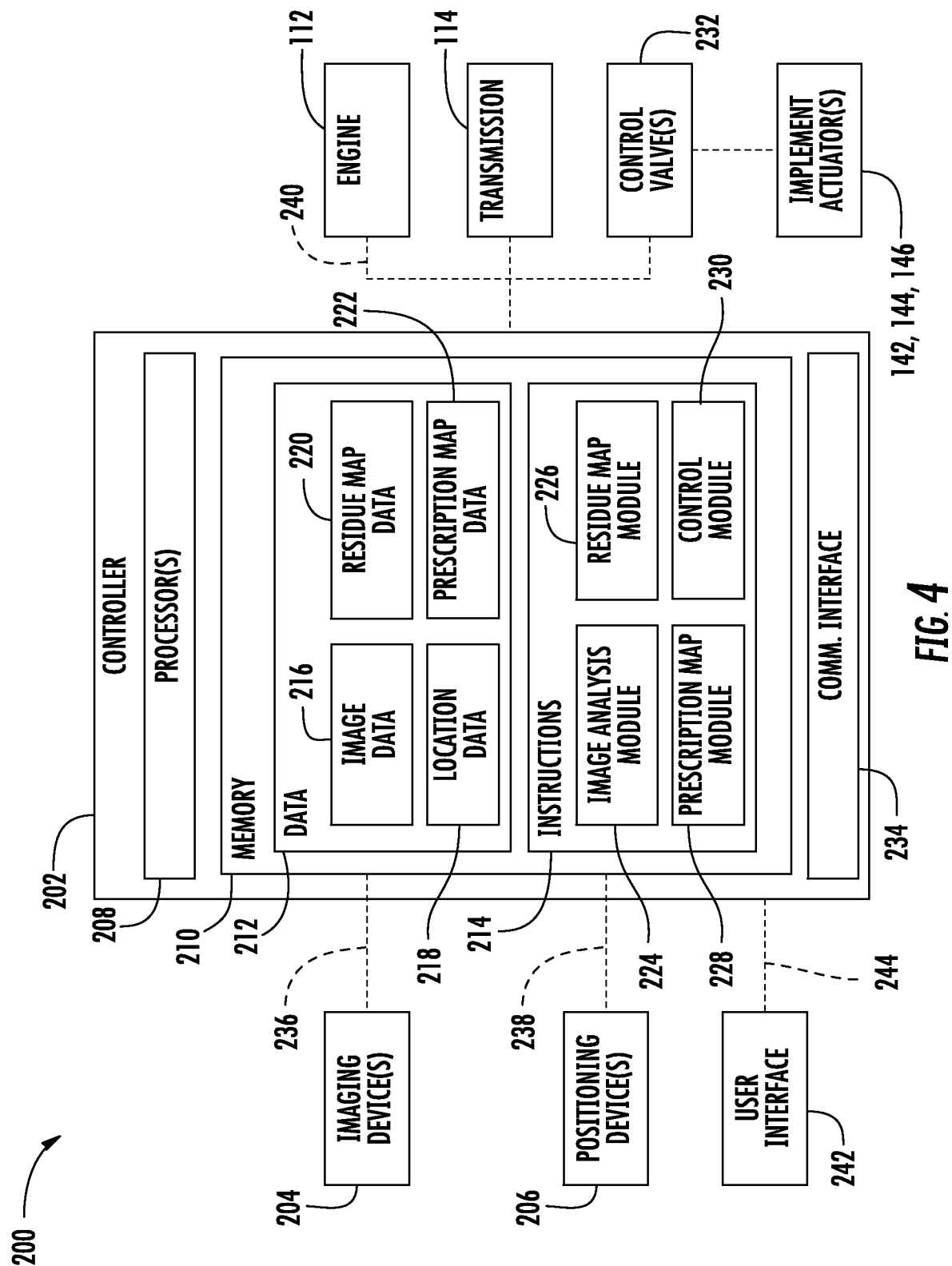
FIG. 4 illustrates a schematic view of one embodiment of a system for determining residue coverage within a field in accordance with aspects of the present subject matter.

Referring now to FIG. 4, a schematic view of one embodiment of a system 200 for determining residue coverage within a field is illustrated in accordance with aspects of the present subject matter. In general, the system 200 will be described herein with reference to the UAV 10, the agricultural implement 100, and the work vehicle 102 described above with reference to FIGS. 1-3. However, it should be appreciated by those of ordinary skill in the art that the disclosed system 200 may generally be utilized with UAVs having any other suitable vehicle configuration, implements having any other suitable implement configuration and/or work vehicles having any other suitable vehicle configuration.

In several embodiments, the system 200 may include a controller 202 and various other components configured to be communicatively coupled to and/or controlled by the controller 202, such as various components of the UAV 10 (e.g., the imaging device(s) 204 and/or the positioning device(s) 206), the implement 100 (e.g., the actuators 142, 144, 146) and/or the vehicle 102 (the engine 112 and/or the transmission 114). As will be described below, the controller 202 may be configured to receive image data from the imaging device(s) 204 associated with the crops present within at least a portion of a field at a plurality of different times during a crop-growing period. Thereafter, the controller 202 may be configured to process/analyze the received image data to generate an estimated residue coverage map of the field. Such residue coverage map may indicate the estimated residue coverage at various positions within the field after the crops depicted within the received image data are harvested. Additionally, based on the estimated residue coverage map, the controller 202 may also be configured to control the operation of the implement 100 and/or the associated vehicle 102 during a post-harvesting operation performed on the field (e.g., a tillage operation).

In general, the controller 202 may correspond to any suitable processor-based device(s), such as a computing device or any combination of computing devices. Thus, as shown in FIG. 4, the controller 202 may generally include one or more processor(s) 208 and associated memory devices 210 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 210 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 210 may generally be configured to store information accessible to the processor(s) 208, including data 212 that can be retrieved, manipulated, created, and/or stored by the processor(s) 208 and instructions 214 that can be executed by the processor(s) 208.

The functions of the controller 202 may be performed by a single processor-based device or may be distributed across any number of processor-based devices, in which instance such devices may be considered to form part of the controller 202. For example, the functions of the controller 202 may be distributed across the onboard UAV controller 24, a remote controller (e.g., a computing device or server database present within a farm operations/management facility), and/or one or more controllers of the implement 100 and/or the vehicle 102 (e.g., an implement controller, a navigation controller, an engine controller, and/or the like). However, the functions of the controller 202 may be performed by any other suitable processor-based device or combination of processor-based devices.

In several embodiments, the data 212 may be stored in one or more databases. For example, the memory 210 may include an image database 216 for storing image data received from the imaging device(s) 204. For example, the imaging device(s) 204 may be configured to capture image data associated with the crops present within a field at several different times during a crop-growing period. In such an embodiment, the data transmitted to the controller 202 from the imaging device(s) 204 may be stored within the image database 216 for subsequent processing and/or analysis. As used herein, the term "image data" may include any suitable type of image-like data received from the imaging device(s) 204 that allows for one or more parameters associated with the crops present within the field (e.g., a parameter(s) associated with the size and/or the health/vitality of the crops) to be determined, including images/photographs, LIDAR data, RADAR data, and/or the like.

Furthermore, as shown in FIG. 4, the memory 210 may also include a location database 218 storing location information about the UAV 10 and/or the implement/vehicle 100/102. More specifically, as described above, in several embodiments, a positioning device(s) 206 may be installed on the UAV 10, with the positioning device(s) 206 configured to determine the current location of the UAV 10 during a pass over the field. Moreover, in one embodiment, another positioning device(s) 206 may be installed on the implement 100 and/or the vehicle 102, with the positioning device(s) 206 configured to determine the current location of the implement 100 and/or the vehicle 102 within the field during a post-harvesting operation (e.g., a tillage operation) on the field. Thereafter, the location of the UAV 10 and/or the implement/vehicle 100/102 determined by the positioning device(s) 206 may be transmitted to the controller 202 (e.g., in the form coordinates) and subsequently stored within the location database 218 for subsequent processing and/or analysis.

Additionally, the memory 210 may include a residue map database 220 for storing information related to an estimated residue coverage map generated for the field. More specifically, as will be described below, the controller 202 may be configured to generate an estimated residue coverage map for the field based on the image data received from the imaging device(s) 204 and the coordinates received from the positioning device(s) 206. Such map may generally indicate the estimated residue coverage at various locations within the field following a harvesting operation. The estimated residue coverage map (and the underlying residue coverage estimates) generated by the controller 202 may then be stored within the residue map database 220 for subsequent processing and/or analysis.

Moreover, in one embodiment, the memory 210 may include a prescription map database 222 for storing information related to a prescription map generated for a post-harvesting operation to be performed on the field. For example, as will be described below, the controller 202 may be configured to generate a prescription map for the field based on the estimated residue coverage map. Such prescription map may generally specify the tool depth, a tool angle, or a ground speed of the implement 100 at each location within the field when performing a post-harvesting operation (e.g., a tillage operation) on the field. The prescription map generated by the controller 202 may then be stored within the prescription map database 222 for use during the post-harvesting operation.

Referring still to FIG. 3, in several embodiments, the instructions 214 stored within the memory 210 of the controller 202 may be executed by the processor(s) 208 to implement an image data analysis module 224. Specifically, in several embodiments, the image data analysis module 224 may be configured to analyze the image data received by the imaging device(s) 204 using one or more image data processing techniques to determine or estimate one or more parameters or characteristics associated with crops depicted in the image data. The determined parameter(s) associated the depicted crops may, in turn, be indicative of the size and/or health/vitality of the crops. For example, in one embodiment, the image data analysis module 224 may be configured to implement one or more edge detection or blob detection techniques to allow the controller 206 to identify the crops depicted in the received image data. Thereafter, in such an embodiment, the image data analysis module 224 may be configured to analyze the detected edges or blobs to determine the parameters of the depicted crops. However, in alternative embodiments, the image data analysis module 224 may be configured to implement any other suitable image processing techniques to determine the parameter(s) associated with crops depicted in the image data.

It should be appreciated that the image data analysis module 224 may determine any parameter(s) or characteristic(s) associated with crops depicted in the image data. For example, such parameters may include the width, height, shape, color, canopy growth/size, stalk size, normalized difference vegetation index (NDVI) value, and/or the like of the depicted crops. However, in alternative embodiments, the image data analysis module 224 may be configured to determine any other suitable parameters or characteristics of the crops depicted in each image.

Additionally, the instructions 214 stored within the memory 210 of the controller 202 may be executed by the processor(s) 208 to implement a residue map module 226. In general, the residue map module 226 may be configured to generate an estimated residue coverage map for the field based on the crop parameters determined by the image analysis module 226. As described above, determined parameter(s) may be indicative of the size and/or health/vitality of the crops present within the field at the time when the image data was captured. The size and/or health/vitality of the crops may, in turn, affect the amount of residue remaining in the field after such crops are harvested. That is, larger and/or healthier crops may typically produce more residue than smaller and/or less healthy crops. Certain conditions present within the field early in the crop-growing period may have an impact on the amount of residue that will be present within the field after a harvesting operation. In certain instances, the existence of such conditions early in the crop-growing period may not be ascertainable from images of the field captured shortly before harvest. For example, dry conditions, high insect activity, and/or low soil nutrient content early in the crop-growing period may result in less healthy crops. However, in such instances, it may not be readily apparent from the images captured late in the crop-growing cycle that such conditions were present early in the crop growing cycle. As such, the residue map module 224 may be configured to estimate the amount of residue that will be present at various locations within the field after harvest based on the crop parameters associated with several images captured at different times during the crop growing cycle. For example, in one embodiment, the residue map module 224 may estimate the residue coverage of a portion of the field based on crop parameters determined from images of that portion of the field captured early in the crop-growing period, midway through the crop-growing period, and late in the crop-growing period. Additionally, in one embodiment, the residue map module 224 may be configured to estimate the residue coverage that will be present at various locations within the field after harvest based one or more inputs associated with a planting operation performed prior to the crop-growing period (e.g., operator-provided seed and/or fertilizer application rates) in addition to the determined crop parameter(s). Thereafter, the residue map module 224 may be configured to generate the estimated residue coverage map based on the residue coverage estimates and the locations associated with the images from which such estimates were determined.

Moreover, as shown in FIG. 4, the instructions 214 stored within the memory 210 of the controller 202 may also be executed by the processor(s) 208 to implement a prescription map module 228. In general, the prescription map module 228 may be configured to analyze the residue coverage map to generate a prescription map for performing a post-harvest agricultural operation (e.g., a tillage operation) within the field. More specifically, the prescription map module 228 may correlate the residue coverage at each position as provided by the residue coverage map to one or more operating parameters or operational settings of the implement 100 and/or the vehicle 102 for performing the post-harvest agricultural operation on the field, such as the tool depth, tool angle, and/or ground speed. Generally, different amounts of residue will require different operational settings for each parameter. For example, deeper tillage depths are required during a subsequent tillage operation for areas of a field with thicker crop residue. The prescription map module 228 may then generate a prescription map that indicates operating parameter(s)/operational setting(s) for implement 100 and/or the vehicle 102 at each position within the field for use in performing the post-harvest agricultural operation.

Additionally, the instructions 214 stored within the memory 210 of the controller 202 may also be executed by the processor(s) 208 to implement a control module 230. Specifically, in several embodiments, the control module 230 may be configured to adjust the operation of the implement 100 and/or the vehicle 102 during the post-harvesting operation based on the generated prescription map. For example, in one embodiment, the control module 230 may be configured to adjust the one or more operating parameters of the engine 112 and/or the transmission 114 of the vehicle 102 to adjust the ground speed of the implement/vehicle 100/102 based on the generated prescription map. Additionally (or as an alternative thereto), in some embodiments, the control module 230 may be configured to adjust the one or more operating parameters of one or more control valves 232 configured to regulate the supply of fluid (e.g., hydraulic fluid or air) to one or more corresponding actuators 142, 144, 146 of the implement 100. In such embodiments, by regulating the supply of fluid to the actuator(s) 142, 144, 146, the control module 230 may automatically adjust the penetration depth of, the angle/orientation of, the force being applied to, and/or any other suitable operating parameter associated with the ground-engaging tools (e.g., the shanks 132, disk blades 136, leveling blades 138, and/or baskets 140) of the implement 100 based on the prescription map. However, in alternative embodiments, the control module 230 may be configured to suitable operating parameters of the implement 100 and/or the vehicle 102 based on the prescription map.

Moreover, as shown in FIG. 4, the controller 202 may also include a communications interface 234 to provide a means for the controller 202 to communicate with any of the various other system components described herein. For instance, one or more communicative links or interfaces 236 (e.g., one or more data buses) may be provided between the communications interface 234 and the imaging device(s) 204 to allow images transmitted from the imaging device(s) 204 to be received by the controller 202. Similarly, one or more communicative links or interfaces 238 (e.g., one or more data buses) may be provided between the communications interface 234 and the positioning device(s) 206 to allow the location information generated by the positioning device(s) 206 to be received by the controller 202. Additionally, as shown in FIG. 4, one or more communicative links or interfaces 240 (e.g., one or more data buses) may be provided between the communications interface 234 and the engine 112, the transmission 114, the control valves 232, and/or the like to allow the controller 202 to control the operation of such system components.

Furthermore, in one embodiment, the system 200 may also include a user interface 242. More specifically, the user interface 242 may be configured to receive one or more operator inputs (e.g., an input(s) associated within a planting operation performed prior to the crop-growing period, such as a seed and/or fertilizer application rate(s)) from the operator of the system 200. As such, the user interface 242 may include one or more input devices (not shown), such as touchscreens, keypads, touchpads, knobs, buttons, sliders, switches, mice, microphones, and/or the like, which are configured to receive user inputs from the operator. The user interface 242 may, in turn, be communicatively coupled to the controller 202 via a communicative link or interface 244 to permit the input(s) to be transmitted from the controller 202 to the user interface 242. In addition, some embodiments of the user interface 242 may include one or more feedback devices (not shown), such as display screens, speakers, warning lights, and/or the like, which are configured to provide feedback from the controller 202 to the operator.

Figure 5:
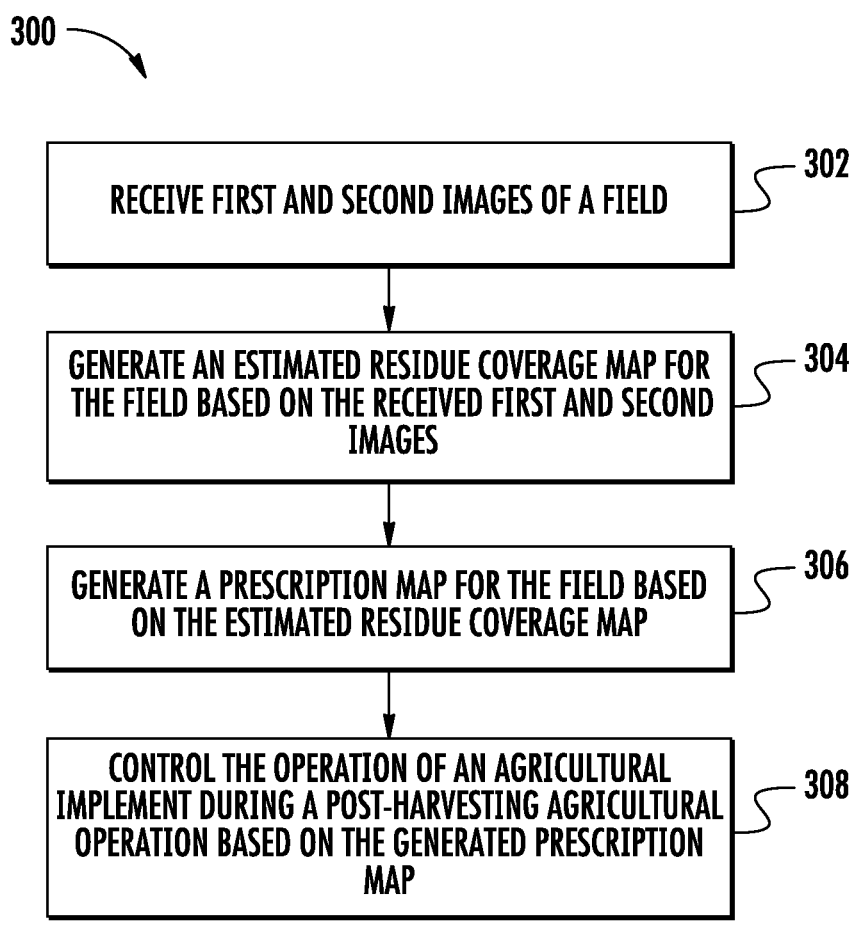
FIG. 5 illustrates a flow diagram of one embodiment of a method for determining residue coverage within a field in accordance with aspects of the present subject matter.

Referring now to FIG. 5, a flow diagram of one embodiment of a method 300 for determining residue coverage within a field is illustrated in accordance with aspects of the present subject matter. In general, the method 300 will be described herein with reference to the UAV 10, the agricultural implement 100, the work vehicle 102, and the system 200 described above with reference to FIGS. 1-4. However, it should be appreciated by those of ordinary skill in the art that the disclosed 300 may generally be implemented with any UAV having any other suitable vehicle configuration, any agricultural implement having any other suitable implement configuration, any work vehicle having any other suitable vehicle configuration, and/or any system having any other suitable system configuration. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 may include receiving, with one or more computing devices, first and second images of a field. As described above, the UAV 10 may include one or more imaging devices 204 (e.g., a camera(s)) configured to capture image data associated with the crops present within the field. As such, the UAV 10 may be flown across the field a plurality of times during a crop-growing period, thereby allowing the imaging device(s) 204 to capture images associated with the crops present within the field at a plurality of times during the crop-growing period. For example, in one embodiment, the UAV 10 may be flown across the field at a first time early in the crop-growing season, a second time midway through the crop growing season, and at a third time shortly before the end of the crop-growing season. Each captured image may, in turn, depict the crops (or one or more characteristics of the crops, such as crop canopy growth) present within at least a portion of the field. Thus, the image data captured by the imaging device(s) 204 may depict the crops present within the field at various different times during the crop growing period. In this respect, as the UAV 10 is flown across the field, the controller 202 (e.g., the UAV-based controller 24) may be configured to receive the captured image data (e.g., a plurality of images) from the imaging device(s) 204 (e.g., via the communicative link 236). As will be described below, the controller 202 may be configured to analyze the received image data to generate an estimated residue map of the field.

It should be appreciated that the crop growing period may generally correspond to any time a crop (e.g., a cash crop) is present within the field. For example, in one embodiment, the crop-growing season may extend from shortly after the crops are planted (e.g., the completion of a planting operation) to shortly before the crops are harvested (e.g., the initiation of a harvesting operation. However, in alternative embodiments, the crop growing period may generally correspond to any time the crops are present within the field, such as particular growth stage(s) of the crops.

Furthermore, at (304), the method 300 may include generating, with the one or more computing devices, an estimated residue coverage map for the field based on the received first and second images. Specifically, as described above, the image analysis module 224 of the controller 202 may be configured to implement one or more suitable image data analysis techniques (e.g., an edge detection and/or blob detection technique(s)) to determine one or more parameters associated within the crops depicted in each received image. Moreover, the residue map module 226 may estimate the amount of residue that will be present within the field after the crops depicted are harvested based on the parameter(s) determined from each image. As described above, by estimating the residue coverage based on parameters derived from images captured at different times during the crop-growing period, the residue map module 226 may provide more accurate residue coverage estimates. Thereafter, the residue map module 226 may generate the estimated residue coverage map based on the residue coverage estimates and the positioning data associated with the image data on which such estimates are based.

In one embodiment, at (304), the method 300 may further include estimate the amount of residue that will be present within the field based on one or more inputs associated within a planting operation performed prior to the crop-growing period in addition to the parameter(s) determined from each image. As described above, the system 200 may include a user interface 242 configured to receive the input(s) associated within the planting operation from the operator. For example, in one embodiment, the input(s) may include the seed application rate and/or the fertilizer application rate associated with the planting operation. In this respect, the controller 202 may be configured to receive the captured input(s) from user interface 242 (e.g., via the communicative link 244). Thereafter, the residue map module 226 may estimate the amount of residue that will be present within the field based on the received input(s) and the parameter(s) determined from each image.

Moreover, as shown in FIG. 5, at (306), the method 300 may include generating, with the one or more computing devices, a prescription map for the field based on the estimated residue coverage map. For example, as described above, the prescription map module 228 of the controller 202 may be configured to generate a prescription map for use during a post-harvest operation (e.g., a subsequent tillage operation) on the field based on the estimated residue coverage map.

Additionally, at (308), the method 300 may include controlling, with the one or more computing devices, the operation of an agricultural implement during a post-harvesting agricultural operation based on the generated prescription map. For example, as described above, the control module 230 of the controller 202 may be configured to control the operation of one or more components of the implement 100 (e.g., the control valve(s) 232 associated with the implement actuator(s) 142, 144, 146) and/or the vehicle 102 (e.g., the engine 112 and/or the transmission 114) based on the generated prescription map during a post-harvesting operation, such as tillage operation.

It is to be understood that the steps of the method 300 are performed by the controller 202 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 202 described herein, such as the method 300, is implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A method for determining residue coverage within a field, the method comprising:
receiving, with one or more computing devices, first and second images of the field, the first image depicting crops present within a portion of the field at a first time during a crop-growing period prior to harvesting of the crops, the second image depicting the crops present within the portion of the field at a second time during the crop-growing period prior to the harvesting of the crops, the first and second times being different;

generating, with the one or more computing devices, an estimated residue coverage map for the field indicating an estimated post-harvest residue coverage at a plurality of locations within the field based on the crops depicted in the received first and second images; and generating, with the one or more computing devices, a prescription map for the field based on the estimated residue coverage map.

2. The method of claim 1, wherein the generated prescription map specifies at least one of a tool depth, a tool angle, or a ground speed of an agricultural implement for the plurality of locations within the field.

3. The method of claim 2, wherein the method further comprises:

controlling, with the one or more computing devices, an operation of the agricultural implement during a post-harvesting agricultural operation based on the generated prescription map.

4. The method of claim 3, wherein the post-harvesting agricultural operation comprises a tillage operation.

5. The method of claim 1, further comprising:

receiving, with the one or more computing devices, an input associated with a planting operation performed prior to the crop-growing period, and wherein generating the estimated residue coverage map comprises generating, with the one or more computing devices, the estimated residue coverage map for the field based on the received input and the received first and second images.

6. The method of claim 5, wherein the received input is indicative of at least one of a seed application rate or a fertilizer application rate.

7. The method of claim 1, wherein the first and second images depict a canopy growth of the crops present within the portion of the field prior to the harvesting of the crops.

8. The method of claim 1, generating the estimated residue coverage map comprises generating, with the one or more computing devices, the estimated residue coverage map for the field indicating the estimated post-harvest residue coverage at the plurality of locations within the field based on a parameter of the crops depicted in the received first and second images.

9. The method of claim 8, wherein the parameter comprises a width, a height, a shape, a color, a stalk size, or a normalized difference vegetation index value.

10. A system for determining residue coverage within a field, the system comprising:

an imaging device configured to capture image data of the field during a crop-growing period prior to a harvesting operation; and a controller communicatively coupled to the imaging device, the controller configured to:

receive first and second images from the imaging device, the first image depicting crops present within a portion of the field at a first time during the crop-growing period prior to harvesting of the crops, the second image depicting the portion of the field at a second time during the crop-growing period prior to the harvesting of the crops, the first and second times being different; and generate an estimated residue coverage map for the field indicating an estimated post-harvest residue coverage at a plurality of locations within the field based on the crops depicted in the received first and second images.

11. The system of claim 10, wherein the controller is further configured to generate a prescription map for the field based on the estimated residue coverage map.

12. The system of claim 11, wherein the generated prescription map specifies at least one of a tool depth, a tool angle, or a ground speed of an agricultural implement for the plurality of locations within the field.

13. The system of claim 12, wherein the controller is further configured to control an operation of the agricultural implement during a post-harvesting agricultural operation based on the generated prescription map.

14. The system of claim 13, wherein the agricultural implement comprises a tillage implement.

15. The system of claim 10, wherein the imaging device is positioned on an unmanned aerial vehicle (UAV).

16. The system of claim 10, wherein the controller is further configured to:

receive an input associated with a planting operation performed prior to the crop-growing period; and generate the estimated residue coverage map for the field based on the received input and the received first and second images.

17. The system of claim 16, wherein the received input is indicative of at least one of a seed application rate or a fertilizer application rate.

18. The system of claim 10, wherein the first and second images depict a canopy growth of the crops present within the portion of the field prior to the harvesting of the crops.

19. The system of claim 10, wherein, when generating the estimated residue coverage map, the controller is further configured to generate the estimated residue coverage map for the field indicating the estimated post-harvest residue coverage at the plurality of locations within the field based on a parameter of the crops depicted in the received first and second images.

20. The system of claim 19, wherein the parameter comprises a width, a height, a shape, a color, a stalk size, or a normalized difference vegetation index value.

* * * * *